(12) United States Patent
Box et al.

(10) Patent No.: US 11,568,011 B2
(45) Date of Patent: Jan. 31, 2023

(54) SYSTEM AND METHOD FOR IMPROVED SEARCHING ACROSS MULTIPLE DATABASES

(71) Applicant: rewardStyle, Inc., Dallas, TX (US)

(72) Inventors: Baxter Box, Dallas, TX (US); Amber Venz Box, Dallas, TX (US); Jason Ellis Pearlman, Dallas, TX (US)

(73) Assignee: rewardStyle, Inc., Dallas, TX (US)

( * ) Notice: Subject to any disclaimer, the term of this patent is extended or adjusted under 35 U.S.C. 154(b) by 148 days.

(21) Appl. No.: 16/670,502

(22) Filed: Oct. 31, 2019

(65) Prior Publication Data

US 2020/0142941 A1     May 7, 2020

Related U.S. Application Data

(60) Provisional application No. 62/827,378, filed on Apr. 1, 2019, provisional application No. 62/754,243, filed on Nov. 1, 2018.

(51) Int. Cl.

| | |
|---|---|
| *G06F 16/30* | (2019.01) |
| *G06F 16/9536* | (2019.01) |
| *G06F 16/907* | (2019.01) |
| *G06F 16/901* | (2019.01) |
| *G06F 16/9032* | (2019.01) |
| *G06F 16/16* | (2019.01) |
| *G06F 16/9538* | (2019.01) |
| *G06F 16/00* | (2019.01) |

(52) U.S. Cl.
CPC ........ *G06F 16/9536* (2019.01); *G06F 16/168* (2019.01); *G06F 16/901* (2019.01); *G06F 16/907* (2019.01); *G06F 16/90332* (2019.01); *G06F 16/9538* (2019.01)

(58) Field of Classification Search
None
See application file for complete search history.

(56) References Cited

U.S. PATENT DOCUMENTS

| | | | | |
|---|---|---|---|---|
| 5,870,765 | A | * | 2/1999 | Bauer ................. G06F 16/27 |
| | | | | 707/610 |
| 5,915,249 | A | | 6/1999 | Spencer |
| 6,182,121 | B1 | | 1/2001 | Wlaschin |
| 6,295,541 | B1 | * | 9/2001 | Bodnar ............. G06F 16/275 |
| 6,647,383 | B1 | | 11/2003 | August et al. |
| 6,727,927 | B1 | | 4/2004 | Dempski et al. |

(Continued)

FOREIGN PATENT DOCUMENTS

AU     2010300096     3/2011

OTHER PUBLICATIONS

Notification of Transmittal of the International Search Report and Written Opinion of the International Search Authority—The European Patent Office—dated Jan. 27, 2020 for International Application No. PCT/US2019/059173, 13 pages.

*Primary Examiner* — Polina G Peach
(74) *Attorney, Agent, or Firm* — Bookoff McAndrews, PLLC

(57) ABSTRACT

A system for database access comprising a plurality of databases, each database having a plurality of defined data fields and a mapping system coupled to the plurality of databases, the mapping system configured to create an algorithmic relationship between a plurality of first fields of a plurality of first databases, and a corresponding field of a plurality of second fields of a plurality of second databases.

17 Claims, 3 Drawing Sheets

(56) References Cited

U.S. PATENT DOCUMENTS

| | | |
|---|---|---|
| 7,181,438 B1 | 2/2007 | Szabo |
| 7,469,254 B2 | 12/2008 | Keith, Jr. |
| 7,685,506 B2* | 3/2010 | Fino ................ G06Q 30/06 |
| | | 715/200 |
| 7,711,702 B2 | 5/2010 | Smolen et al. |
| 7,752,166 B2* | 7/2010 | Quinlan ............ G06F 16/273 |
| | | 707/613 |
| 8,543,566 B2 | 9/2013 | Weissman et al. |
| 8,818,996 B2 | 8/2014 | Barney |
| 9,495,693 B2 | 11/2016 | Box et al. |
| 9,779,425 B2 | 10/2017 | Soliartchouk et al. |
| 9,875,488 B2 | 1/2018 | Box et al. |
| 10,319,016 B2* | 6/2019 | Van Sickle ....... G06Q 30/0625 |
| 10,380,672 B2* | 8/2019 | Linden ............ G06Q 50/01 |
| 10,423,657 B2 | 9/2019 | Pearlman et al. |
| 10,475,084 B2 | 11/2019 | Soliartchouk et al. |
| 10,535,080 B2 | 1/2020 | Jordan et al. |
| 10,684,738 B1* | 6/2020 | Sicora .............. G06F 16/435 |
| 10,904,346 B2* | 1/2021 | Fu ................... G06F 16/535 |
| 10,909,601 B2* | 2/2021 | Linden ............ G06Q 30/0631 |
| 2009/0112794 A1 | 4/2009 | Dettinger et al. |
| 2014/0089134 A1* | 3/2014 | Linh ............... G06Q 20/384 |
| | | 705/26.7 |
| 2014/0129317 A1* | 5/2014 | Grishaver ........ G06Q 30/0255 |
| | | 705/14.39 |
| 2014/0279039 A1* | 9/2014 | Systrom .......... G06Q 30/0224 |
| | | 705/14.66 |
| 2015/0006301 A1* | 1/2015 | McMillion ....... G06Q 50/01 |
| | | 705/14.73 |
| 2015/0100458 A1* | 4/2015 | Linden ............ G06Q 50/01 |
| | | 705/26.8 |
| 2015/0199770 A1* | 7/2015 | Wallenstein ..... G06Q 30/0605 |
| | | 705/26.2 |
| 2016/0092960 A1* | 3/2016 | Deshpande ...... G06Q 30/0625 |
| | | 705/26.62 |
| 2017/0116658 A1* | 4/2017 | Baid ............... G06Q 30/0625 |
| 2017/0228815 A1* | 8/2017 | Plaehn ............ G06Q 10/087 |
| 2017/0270498 A1* | 9/2017 | Maenpaa ......... G06Q 30/0641 |
| 2018/0048696 A1* | 2/2018 | Cheng ............. H04L 67/146 |
| 2019/0228020 A1* | 7/2019 | Sawatzky ........ G06F 16/273 |

\* cited by examiner

SYSTEM AND METHOD FOR IMPROVED SEARCHING ACROSS MULTIPLE DATABASES

RELATED APPLICATIONS

The present application claims priority to and benefit of U.S. Provisional Patent Application No. 62/754,243, filed Nov. 1, 2018, and U.S. Provisional Patent Application No. 62/827,378, filed Apr. 1, 2019, each of which are hereby incorporated by reference for all purposes as if set forth herein in their entirety.

TECHNICAL FIELD

The present disclosure relates generally to searching databases, and more specifically to a system and method for improved searching across multiple databases.

BACKGROUND OF THE INVENTION

Searching databases typically involves using structured or unstructured searches on large compilations of data, with some rudimentary field-specific search functionality.

SUMMARY OF THE INVENTION

A system for database access is disclosed that includes a plurality of databases, where each database has a plurality of defined data fields. A mapping system is configured to create an algorithmic relationship between a plurality of first fields of a plurality of first databases, and a corresponding field of a plurality of second fields of a plurality of second databases. In this manner, changes made to one database can be promulgated to the other databases.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings may be to scale, but emphasis is placed upon clearly illustrating the principles of the present disclosure. Moreover, in the drawings, like reference numerals designate corresponding parts throughout the several views, and in which.

DETAILED DESCRIPTION OF THE INVENTION

Figure 1:
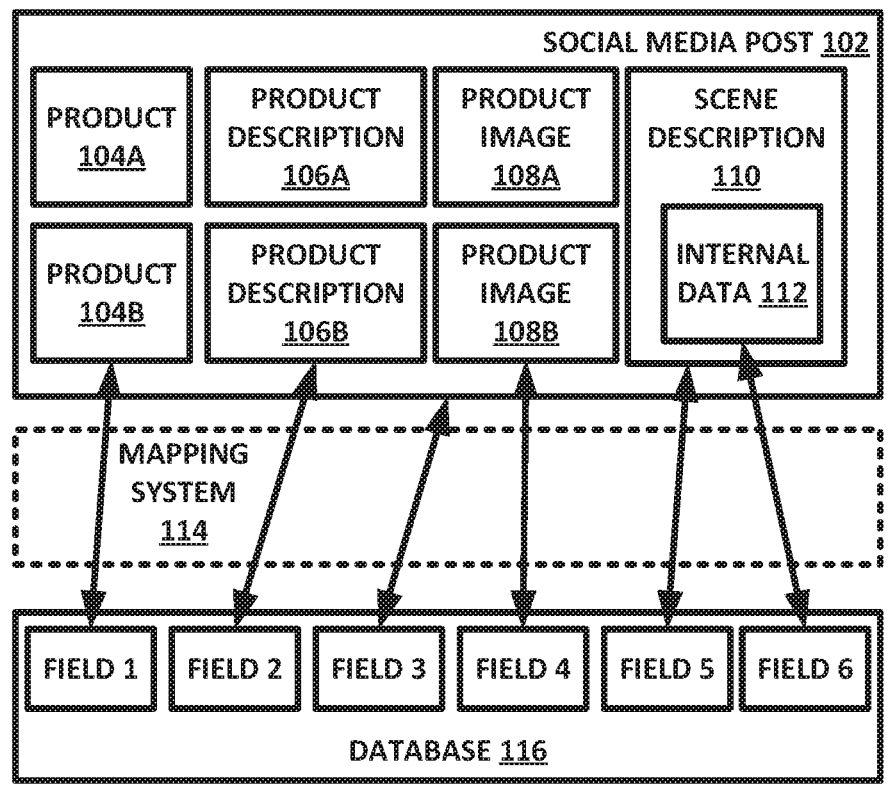
FIG. 1 is a diagram of system for providing database mapping functionality, in accordance with an example embodiment of the present disclosure.

In the description that follows, like parts are marked throughout the specification and drawings with the same reference numerals. The drawing figures may be to scale and certain components can be shown in generalized or schematic form and identified by commercial designations in the interest of clarity and conciseness.

The functional aspects of the present disclosure include a reliable and effective product and social media post search tool, such as for use by social media posters and their followers or for users that are looking for products. The social media posts are a form of contextualized media that can include static imagery, videos and other data, and can have associated metadata, including commerce-related metadata that it is used to provide rich search results, such as to allow a user to identify specific products of interest. For example, the present disclosure can be used to provide a keyword search that returns contextual media results that can be used in an associated commercial transaction, such as shopping. The contextual media has associated metadata that can identify products that are presently available for purchase that are associated with the presented contextual media, or other suitable metadata. In this embodiment, the associated metadata does not provide the context, and instead, can be a function of the context, as discussed further herein. The present disclosure thus provides substantially more than prior art search tools that are used to search individual databases, because different databases can be accessed by the social media posters and their followers in a single search. The present disclosure thus allows such dynamic database interactions to be accommodated. The present disclosure provides a number of practical applications and technical features.

One practical application of the present disclosure is a product-related search service that operates on a processor and that includes algorithms that provide the ability to create, read, update and delete products as well as to search products. These algorithmic functions are coordinated across multiple databases and are structured to maintain data integrity across those databases, as disclosed and discussed herein. In one example embodiment, a database can include data associated with a specific social media, such as metadata for tagged items within the social media post, where the structure of the tags and associated items within the social media post also forms part of the data. In this embodiment, the placement of a tag, image data associated with the tag and metadata associated with the tag can form different fields or multiple different fields within the database for that social media source. Mapping of such social media post database content to other databases can be performed by a dedicated mapping system that can be implemented on a processor by one or more algorithms that are configured to perform field to field mapping, post to field mapping, tag to field mapping, metadata to field mapping, image data to field mapping or other suitable types of mapping. These algorithms can include defined relationships between fields, posts, tags, metadata and so forth, where the relationships can be identified by a programmer, identified using artificial intelligence or otherwise identified, but can be implemented in an algorithm to accelerate the execution of the algorithms and to allow complex relationships to be created. Thus, the present disclosure provides a system that allows a user to 1) find relevant fields in diverse databases, 2) compare the content of the fields to determine relevancy, and 3) create mapping relationships for future automated applications.

Likewise, mapping of multiple different types of social media data fields can also or alternatively be performed, such as post to post mapping, tag to tag mapping, metadata to metadata mapping, image data to image data mapping or other suitable types of mapping.

A system and method in accordance with the teachings of the present disclosure can also include integration of product search with an internal product database, website tools, web log ("blog") tools, social media tools and so forth. These tools are algorithms that assist with the creation of content, and allow the user to include product-related data in the content that is up to date and accurate. This integration includes the ability to limit the search to one or more different databases or other sources, such as to search an internal product database and a social media post database to determine how social media posts present product data and to compare that with the internal product database information, and for other suitable purposes.

A system and method in accordance with the teachings of the present disclosure can also add a product schema that is applicable to each of the databases (such as rules, selectors and scraping) and data migration tools that are compatible with the different databases. The present disclosure thus allows data to be easily transferred between and utilized within the various databases.

Each database can have a different structure and can have a separate and distinct search functionality. The searches can be nested and ordered based on the search rules and functionality for each data source. In this manner, the results of the search can differ based on the order in which the databases are searched and the search terms and structure used for each database.

In one example embodiment, searches can have a first optimal search order, where search inputs to database 1 are different from search inputs to database 2, and where the search sequence uses a first set of inputs to database 1, and then uses the results from that search to select inputs to database 2, which can provide different results than a search sequence where a second set of inputs is provided to database 2, and where those results are used to select inputs to database 1, and so forth for additional databases. In the example discussed above, a search starting with a first social media database that includes image data, tags and metadata that is mapped to a second non-social media database that contains separate fields such as columns and rows and which is then mapped to a third social media database can return different results than a search that starts with the non-social media database and that is then mapped to the first social media database and the second social media database. For example, a search for the term "black hat" in the first social media database can result in associated product names that can be mapped to many different black hat products in a non-social media product database, which can then be used to find those specific products in the second social media database that have associated product names and SKU numbers, such as where the second social media database does not include the term "black hat" but includes product names for some entries and SKU numbers for other entries. In this example embodiment, a search for black hats in the second social media database would not produce any meaningful results, and a search for SKU numbers in the first social media database would likewise not produce any meaningful results, but the disclosed structured database search can be used to provide additional functionality that is not present in any one of the three separate databases.

In another example embodiment, the databases can include data structures disclosed in U.S. Pat. Nos. 9,779, 425; 9,875,488; and 9,495,693; U.S. patent application Ser. Nos. 15/842,026; 15/211,321; 13/905,926; 13/838,578 and 13/547,771, each of which are hereby incorporated by reference for all purposes as if set forth herein in their entireties, or other suitable databases.

A system and method in accordance with the teachings of the present disclosure can also modify existing database-specific access tools based on the product schema and the access rules for accessing multiple databases. For example, when a user updates a product description in one database, such as in a blog post or a product inventory database, the present disclosure can allow those updates to be promulgated to other databases, such as when a predefined algorithmic relationship has been defined between the field by the user and the other database fields. In this embodiment, a user that updates a product description in a blog post can be presented with the product description in a product inventory database, and can either use that description for the blog post, or modify that description if it is incorrect in the product inventory database. That updated product inventory database description can then be updated in other database entries that have been algorithmically associated with the data field.

A system and method in accordance with the teachings of the present disclosure can also modify a database to include a product schema that is structured in that products that are searched will have a time relevancy parameter. In one example embodiment, newer products that are added into any of the databases can get priority viewing, products that are trending in sales (sales time relevancy) can get priority viewing, and so forth.

A system and method in accordance with the teachings of the present disclosure can also provide additional capabilities that can be included in a "like to know it" social media post search function, for a database where users have provided an indication of interest in response to social media posts. For example, the system and method can provide the ability to dynamically curate the content to not display items that are sold out or no longer sold, such as by cross-referencing social media posts as a function of one or more products that are identified in the social media post. The ability to leverage clicks from searches to increase relevancy can also be provided, such as to increase a relevancy score for a social media post in response to a search term based on the number of times that social media post is selected in response to a search, the number of times that a purchase or click through event is made from that social media post, or in other suitable manners. In general, the relevancy functionality allows consumer behavioral patterns to be tracked and used to leverage the relevancy of social media posts, and can be applied to any of the subsystems discussed herein, even if not specifically address in regards to each subsystem for the sake of brevity.

The ability to add metadata to images in order to create more relevant descriptions can also be provided, including but not limited to images for social media posts and images for products that are available from different websites. The metadata can be added manually (such as in response to a social media viewer's selection of content or addition of search terms), automatically (such as to apply modifications made to metadata in a first database to related data in other databases) or in other suitable manners. Default options can be provided with a list of additional options that are generated as a function of what has been searched, the results of the search and the actions and inactions taken by a user in response to the search results, including selection of search results and content within search results, to add additional metadata to images and so forth.

A field can be added in one or more of the databases to take into account predefined metadata such as "hash tags" made by the social media posters, as a separate searchable field. An "ignore list" can also be provided to allow predetermined fields, certain data within certain fields or other suitable database content to be ignored as a function of database or database entry point. For example, if a search is being conducted for the term "shoe," social media posts by a user having a name that includes "shoe" such as "shoemaker," stores that have a name that includes "shoe" and other fields that are not of interest can be selected and excluded by a user. In one example embodiment, the ignore list functionality can be dynamic, and a user can be presented with a preliminary identification of fields that include the term and can exclude fields that should not be included. Likewise, relevancy data can be provided, such as to identify the fields where the term is most and least likely to be used, and so forth.

A "popular search" functionality can be provided that utilizes a manual approach (such as where a user requests popular searches for fields or terms), an automatic approach (such as where popular searches related to a search term are presented), or other suitable popular search functions. An "auto-complete" functionality that can present other search phrases that have been used previously by the same user or different users can also be provided. In one example embodiment, the auto complete function can be modified based on search history, popular searches, trending searches or in other suitable manners.

The ability to provide "did you mean" functionality which uses the results of past searches to help narrow search results in order to help users find what they are looking for can be provided. In one example embodiment, the user can search for the term "black tie" and the search function can prompt the user to identify whether they meant a black tie product, a black tie event or something else. The ability to provide a real time search index can also be provided, which can update the data every time that an influencer makes a social media post, every time a new product entry is created or in other similar manners.

The ability to find "similar" results to a product or social media post, to use a "reverse" search method against the search conditions to generate a given result can also be provided. For example, "similar" results can be similar in a number of different ways, such as similarity to different fields in different databases for a number of different fields associated with a product or social media post. Use of image analysis to improve search and to find new items can also be provided. In one example embodiment, an image can be analyzed to identify a plurality of different field identifiers, which can be used to supplement or confirm other field identifiers. For example, an image can have a field identifier of "shirt" but not of "hat," but the image can be selected in response to search results for the search term "shirt and hat."

FIG. 1 is a diagram of system 100 for providing database mapping functionality, in accordance with an example embodiment of the present disclosure. System 100 includes social media post 102, which further includes products 104A and 104B, product descriptions 106A and 106B, product images 108A and 108B, scene description 110 and internal data 112. System 100 further includes database 116 with fields 1 through 6, and mapping system 114. System 100 can be implemented in hardware or a suitable combination of hardware and software.

Social media post 102 is data stored in defined memory locations and additional algorithmic functionality that is configured to allow a processor to generate a user display that includes the identified data fields. In one example embodiment, social media post can include predetermined user controls that allow a user to select hyperlinks or other controls contained within social media post 102, such as to navigate to other content, to open a web browser user interface window, to add a post or to perform other suitable functions. The data fields of social media post 102 can be implemented as part of the algorithmic functionality or in other suitable manners.

Products 104A and 104B are defined data fields that include a product name, a product identification number, a product catalog number, a product part number or other product data that can be used to locate the product and uniquely identify the product. In this regard, the unique identification can be limited to uniquely identifying the product within social media post 102, such as "black hat" when social media post 102 includes a product image of a black hat and a white hat, "large black hat" when social media post 102 includes a product image of a large and a small black hat, and other suitable product identifying data. Also or alternatively, products 104A and 104B can include a product catalog number, a stock keeping unit number or SKU, a part number or other suitable data or combinations of data.

Product descriptions 106A and 106B are data fields that include a user-description of products 104A and 104B, such as a description of the fabric or material that the products are made from, a description of the intended use of the product or other suitable description product data. In one example embodiment, product descriptions 106A and 106B can include a hyperlink to a different database, can provide one or more hyperlinks for use by other databases or can include other suitable data.

Product images 108A and 108B can be one or more sets of image data that are associated with products 104A and 104B and product descriptions 106A and 106B. In one example embodiment, product images 108A and 108B can be contained within the same set of image data, can be separate sets of image data, can be a first set of image data that includes images of both products 104A and 104B and a second set and a third set of image data that include corresponding separate images of each product 104A and 104B, or other suitable image data. One or more sets of image data associated with product images 108A and 108B can also or alternatively include a hyperlink to a different image database, can provide one or more hyperlinks for use by other image databases or can include other suitable data.

Scene description 110 can be a text or other suitable description of a scene that includes products 104A and 104B, such as a description of the event or location where product images 108A and 108B where obtained, a description of events or locations where products 104A and 104B can be used, or other suitable data. In one example embodiment, scene description 110 can include a social media post that has been made by an author associated with social media post 102, such as the person associated with the social media account where social media post 102 was created. In this regard, it is noted that social media post 102 can be created prior to actual posting on a social media application or website, such as where social media post 102 will be processed into a single image data set or other suitable data sets, and where the components of social media post 102 are not directly accessible, such as a Facebook post, an Instagram post, a blog post or other suitable social media posts.

Also or alternatively, the components of social media post 102 can be separately stored in a social media database of a social media application or website, such as a Facebook post, an Instagram post, a blog post or other suitable social media posts.

Internal data 112 can be a data field that is contained within scene description 110 or other data fields (such as products 104A or 104B, product descriptions 106A or 106B, product images 108A or 108B and so forth). In one example embodiment, internal data 112 can be identified using a predetermined character, such as a hash tag ("#"), a predetermined sequence of characters or other suitable data. In another example embodiment, internal data 112 can be an image data watermark or other suitable data that is used to uniquely identify data after processing the data with a predetermined algorithm, such as an optical character recognition algorithm, a watermark detection algorithm or so forth. Internal data 112 can be correlated with one or more of product 104A or 104B, product description 106A or 106B, product image 108A or 108B, scene description 110 or other suitable data, can be independent of any other data or other suitable correlations or associations can also or alternatively be used.

Database 116 and fields 1 through 6 can be a relational database, a document-oriented database, an operational database, a distributed database, a cloud database, an object database, a column-oriented database, a key value database or other suitable databases that contain existing data sets, empty data sets, alphanumeric data sets, image data sets or other suitable types of data. Mapping system 114 can include one or more predefined or user-defined associations between fields 1 through 6 of database 116 and one or more of products 104A or 104B, product descriptions 106A or 106B, product images 108A or 108B, scene description 110, internal data 112 or other suitable data. Although a single database 116 is shown, additional databases can also or alternatively have fields that are mapped by mapping system 114, such as to create algorithmic rules for associating data fields, posts, hyperlinks, tags or other suitable data in a first database or system with data fields, posts, hyperlinks, tags or other suitable data in one or more second databases or systems. The number and sequence of algorithmic mapping relationships is flexible, and can include different mapping relationships for the same field of social media post 102 to different fields of different databases, different mapping relationships between different databases to social media post 102, mapping relationships between social media post 102 and other social media posts, or other suitable algorithmic mapping relationships. Fields 1 through 6 are an example embodiment, and any suitable number of fields can also or alternatively be used.

In operation, system 100 allows social media post 102 to be mapped to fields 1 through 6 of database 116 through mapping system 114, and can provide additional mapping functionality between other social media posts, other databases, other types of social media and other types of databases, or other suitable mapping functionality. System 100 allows user-defined algorithms, predefined algorithms or other algorithmic functionality to be implemented to facilitate mapping of data and fields.

Figure 2:
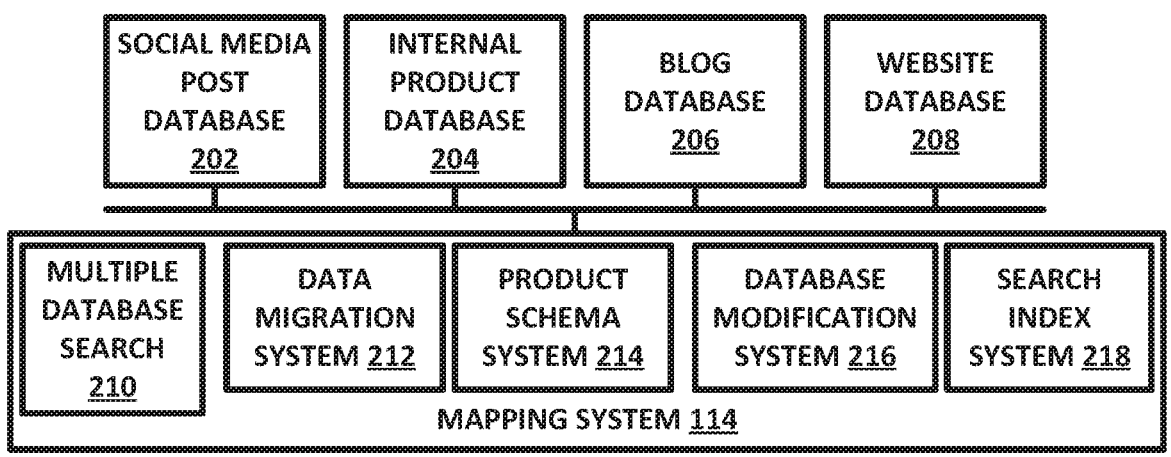
FIG. 2 is a diagram of system for mapping fields between different databases, in accordance with an example embodiment of the present disclosure.

FIG. 2 is a diagram of system 200 for mapping fields between different databases, in accordance with an example embodiment of the present disclosure. System 200 includes mapping system 114 and social media post database 202, internal product database 204, blog database 206, website database 208, multiple database search system 210, data migration system 212, product schema system 214, database modification system 216 and search index system 218, each of which can be implemented in hardware or a suitable combination of hardware and software.

Social media post database 202 includes data from one or more social media posts. In one example embodiment, social media post database 202 can be maintained by a social media website, but can also or alternatively be maintained by a third party organization that provides support to users of a social media website. Social media post database 202 can include one or more data fields that are defined and associated with social media posts, such as product identifiers, product descriptions, product images, scene descriptions, internal data and other suitable data fields, either in a relational database or other suitable databases.

Internal product database 204 includes data for each of a plurality of products. In one example embodiment, internal product database 204 can be maintained by a manufacturer, wholesale sales organization, retail sales organization or other suitable organizations, but can also or alternatively be maintained by a third party organization that provides support to manufacturers or sales organizations. Internal product database 204 can include one or more data fields that are defined and associated with products, such as product identifiers, product descriptions, product images, internal data and other suitable data fields, either in a relational database or other suitable databases.

Blog database 206 includes data for each of a plurality of website log entries. In one example embodiment, blog database 206 can be maintained by a website log services provider, but can also or alternatively be maintained by a third party organization that provides support to website log services providers. Blog database 206 can include one or more data fields that are defined and associated with products, such as product identifiers, product descriptions, product images, internal data and other suitable data fields, either in a relational database or other suitable databases.

Website database 208 includes data for each of a plurality of website service providers. In one example embodiment, website database 208 can be maintained by a website commerce services provider, but can also or alternatively be maintained by a third party organization that provides support to website commerce services providers. Website database 208 can include one or more data fields that are defined and associated with products, such as product identifiers, product descriptions, product images, internal data and other suitable data fields, either in a relational database or other suitable databases.

Multiple database search system 210 can include one or more algorithms operating on a general purpose processor or other suitable systems that are configured to generate a user prompt to enter a search term and associated search commands, and to search multiple databases using the search term and associated search commands. In one example embodiment, multiple database search system 210 can receive a product query with one or more terms or identifiers, and can return database search results from multiple unrelated databases that include the terms or identifiers, where the database search results include products and associated product data, such as images, descriptions and so forth. In another example embodiment, a series of database queries can be identified, such as where a product database for a retailer is searched first using descriptive product terms (such as "black hat" or "grey slacks") to obtain product catalog numbers, and where a database of social media posts is then searched using the product catalog numbers, by using the descriptive product terms and the product catalog numbers or in other suitable manners. In another example embodiment, descriptive product terms can be used to search a plurality of first databases, such as retail website sales databases, and the results can be used to generate an ordered list that is sorted by sales information. A user can then select one or more entries from the list, and the results can be used to search a plurality of social media databases, where the results can be used to generate an ordered list that is sorted by a relevance metric, such as a number of views, "likes" or other indicators of relevance. Likewise, other suitable multiple database search sequencing and results display functionality can also or alternatively be provided.

Data migration system 212 can include one or more algorithms operating on a general purpose processor or other suitable systems that are configured to generate a user prompt to display mapped fields from two or more databases and to create data migration relationships between the fields. In one example embodiment, a user can review a product description field from a product database and a product description field from a social media post, and can activate a control to create a data migration relationship between the two fields, such as to make the social media post dependent on the product database, to make the product database dependent on the social media post or in other suitable embodiments. In another example embodiment, product description fields from a plurality of social media posts can be made dependent on a product description field in a product database, a plurality of different product description fields in a plurality of social media posts, blog posts, websites and other databases can be made dependent on one or more product description fields in a products database, or other suitable functions can also or alternatively be provided.

Product schema system 214 can include one or more algorithms operating on a general purpose processor or other suitable systems that are configured to generate a product schema for one or more databases. In one example embodiment, a product schema can be used to associate social media posts, blogs, textual data, image data sets or other suitable data with other related data. In this example embodiment, a schema can include larger classes (e.g. men, women, children), and successive narrower classes in each product class (e.g. pants, shirts, shoes, and then sizes, colors, fabric and so forth). Product schema system 214 can modify a database structure to include the product schema, such as by generating one or more user prompts for a user to select fields to be associated with a schema, to associate the schema with the existing database fields or in other suitable manners. In another embodiment, relevance data can be used to select entries for review by a user, such as to ensure that products or posts that have a predetermined level of relevancy are reviewed to ensure that the data is correct. In this example embodiment, a user can be notified that a social media post or other data has been viewed a predetermined number of times, a predetermined number of times during a period of time, that the number of view per unit of time is increasing or of other suitable data, and the user can review the data and associated data in other databases to ensure that the schema associate with the data is consistent, such as to provide prompt correction in the case of inconsistencies.

Database modification system 216 can include one or more algorithms operating on a general purpose processor or other suitable systems that are configured to generate a user prompt to modify a database structure. In one example embodiment, a database field can be added or merged with another database field, a selected group of database fields can be deleted and replaced with other database fields, mapped associations or hyperlinks can be created that define an association between database fields within a database or other suitable algorithmic structures or functions can be implemented. In another embodiment, relevance data can be used to select entries for review by a user, such as to ensure that products or posts that have a predetermined level of relevancy are reviewed to ensure that the data is correct. In this example embodiment, a user can be notified that a social media post or other data has been viewed a predetermined number of times, a predetermined number of times during a period of time, that the number of view per unit of time is increasing or of other suitable data, and the user can review the data and associated data in other databases to ensure that it is consistent, such as to provide prompt correction in the case of inconsistencies.

Search index system 218 can include one or more algorithms operating on a general purpose processor or other suitable systems that are configured to generate a user prompt to enter a search term and associated search commands, and to generate a search index for one or more databases. In one example embodiment, the search index can include algorithmic functionality that dynamically creates and supplements an index with each successive search. In this example embodiment, a search for the term "black hat" in a database of social media posts can generate a number of hits, and the search index can be incremented for the total number of hits, for the hits associated with the term, the hits associated each social media post and so forth. Search index system 218 can generate a stand-alone search index, can create a database structure for storing the search index in each searched database or other suitable functions can also or alternatively be implemented.

In operation, system 200 allows data fields in different databases to be associated with each other to improve the ability to search each database and the uniformity of the contents of each database. System 200 thus provides practical applications for improving the ability to identify products in different databases, to ensure that the products are the same, to track the search results of searches for products and other functions that are substantially more than the current known systems and processes that only allow individual searches to be performed of separate databases.

Figure 3:
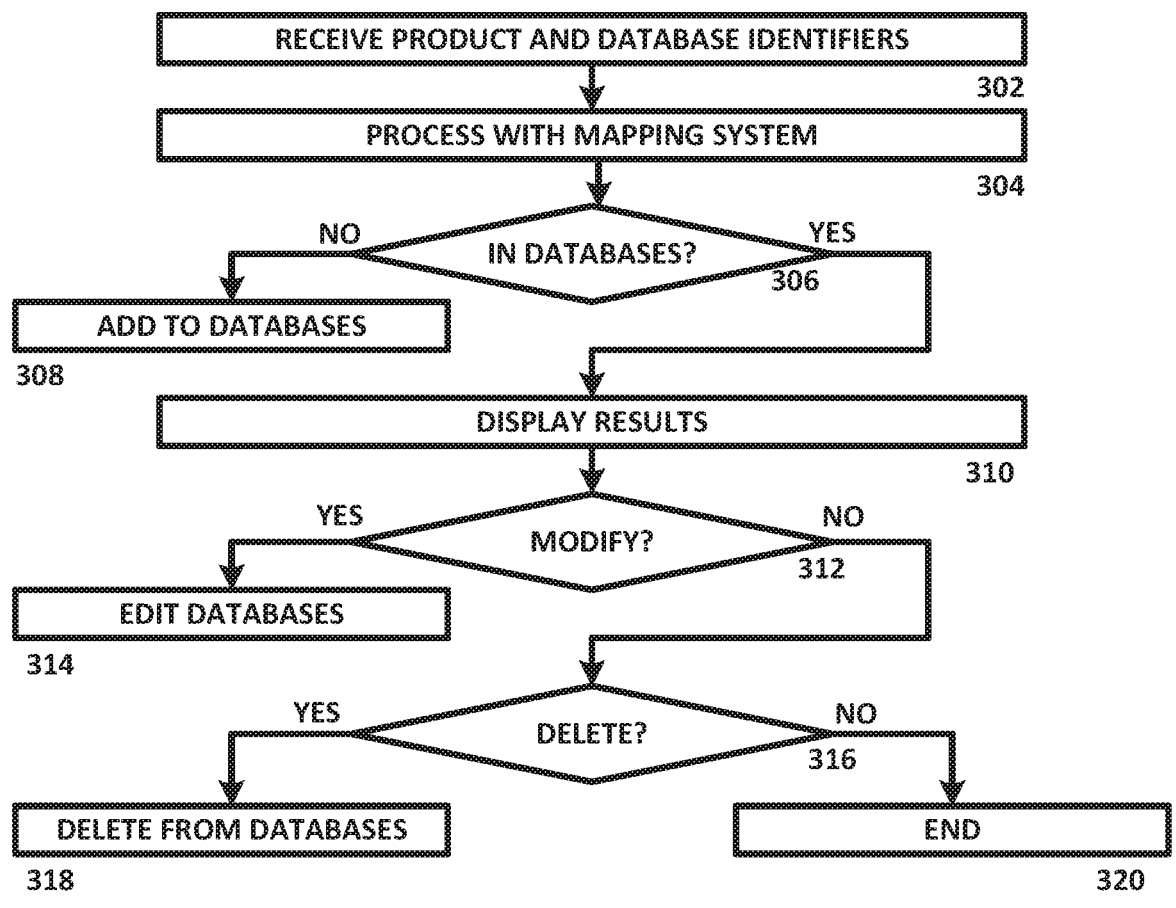
FIG. 3 is a diagram of algorithm for providing product update mapping functionality, in accordance with an example embodiment of the present disclosure.

FIG. 3 is a diagram of algorithm 300 for providing product update mapping functionality, in accordance with an example embodiment of the present disclosure. Algorithm 300 can be implemented in hardware or a suitable combination of hardware and software, and can operate on one or more processor platforms.

Algorithm 300 begins at 302, where product and database identifiers are received. In one example embodiment, the algorithm can generate a user interface control that allows a user to select from a list of available databases, and to enter a product identifier, a product name, or other suitable product data. The algorithm then proceeds to 304.

At 304, the product and database identifier data is processed with a mapping system. In one example embodiment, the mapping system can search one or more fields in each of the identified databases using the product data, such as by searching each database in parallel, by performing a series of searches where a first database is searched (such as a social media post database) and where the results from the first database are then used to search a second database (such as a product database). Likewise, additional searches or series of searches can also or alternatively be performed. The algorithm then proceeds to 306.

At 306, it is determined whether the product is in the identified databases. If it is determined that the product is in the identified databases, the algorithm proceeds to 310, otherwise the algorithm proceeds to 308.

At 308, the product is added to the databases. In one example embodiment, a search can identify a product in a first database (such as a social media post database) but not in a second database (such as a product database). In this example embodiment, the product can be added to the product database, with additional information that might be included in that database but which might not be present in the social media post database, such as product descriptions, catalog numbers and so forth.

At 310, the results from the databases are displayed. In one example embodiment, predetermined fields from a first database can be displayed adjacent to predetermined fields from a second database, such as product description fields, catalog number fields and so forth. The algorithm then proceeds to 312.

At 312, it is determined whether the data should be modified. If it is determined that the data should be modified, the algorithm proceeds to 314, otherwise the algorithm proceeds to 316.

At 314, the databases are edited. In one example embodiment, a product description field from a product database can be used to supplement or replace product description data in a social media post, such as by deleting the product description data from the social media post and adding the product description data to the social media database, by including a hyperlink to the product database from the social media post, or in other suitable manners.

At 316, it is determined whether the data should be deleted. If it is determined that the data should be deleted, the algorithm proceeds to 318, otherwise the algorithm proceeds to 320 and terminates. At 318, the data is deleted from the databases. In one example embodiment, the data for a single field can be deleted, data for a group of fields in one or more databases can be deleted and replaced with a hyperlink to the fields of a second database or other suitable processes can also or alternatively be used.

In operation, algorithm 300 allows data in multiple databases to be edited and coordinated, to provide the practical application of improving the consistency of search results and the accuracy of data in multiple databases. Algorithm 300 provides substantially more than the prior art by allowing related data in different databases to be readily identified and added, edited or deleted. Although algorithm 300 is shown as a flow chart, the functions of algorithm 300 can also or alternatively be implemented as objected oriented programming, using a state diagram or in other suitable manners.

Figure 4:
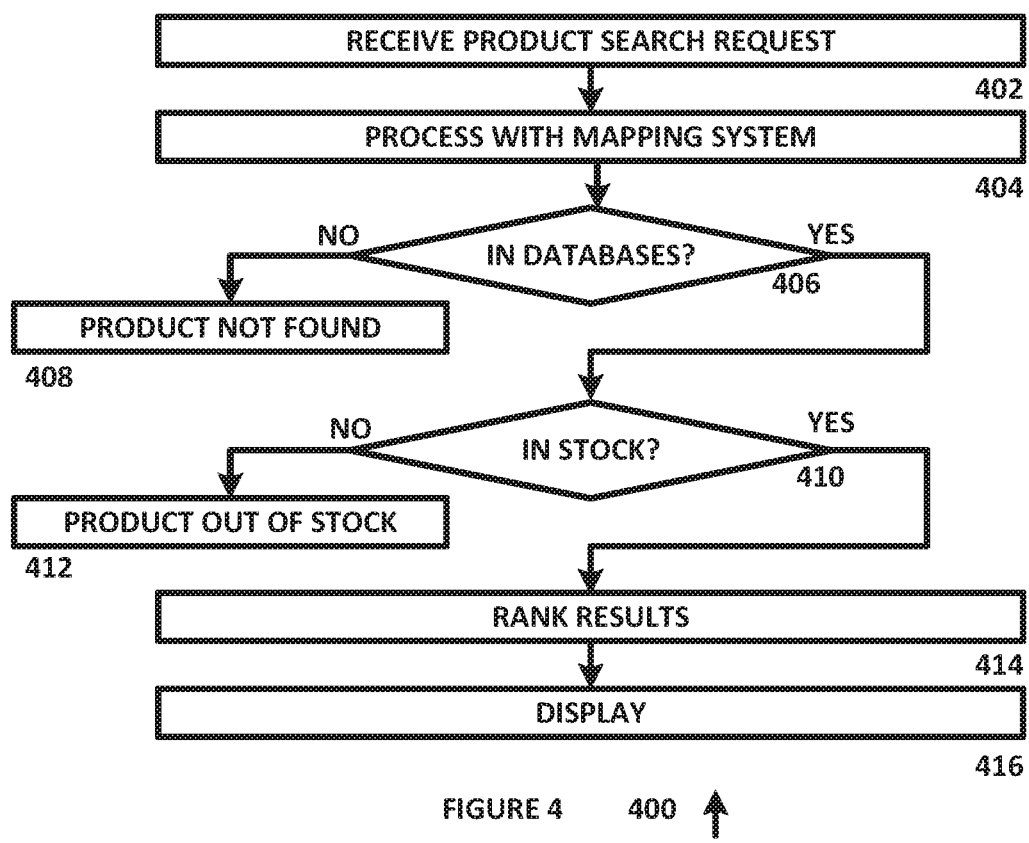
FIG. 4 is a diagram of algorithm for providing product search mapping functionality, in accordance with an example embodiment of the present disclosure.

FIG. 4 is a diagram of algorithm 400 for providing product search mapping functionality, in accordance with an example embodiment of the present disclosure. Algorithm 400 can be implemented in hardware or a suitable combination of hardware and software, and can operate on one or more processor platforms.

Algorithm 400 begins at 402, where a product search request is received. In one example embodiment, the algorithm can generate one or more user controls that prompt a user to enter a search query for a product, a catalog number or other suitable data. The algorithm then proceeds to 404.

At 404, the product search data is processed with a mapping system. In one example embodiment, a user can be looking for products of a certain type, such as a "black hat." The product description term "black hat" can be mapped to product databases and to social media posts by the mapping system, to identify posts products from product databases that are "black hats" and to identify social media posts that show pictures of "black hats" with other clothing. Likewise, other functions can also or alternatively be provided. The algorithm then proceeds to 406.

At 406, it is determined whether the product is in any databases. If the product is not in any databases, the algorithm proceeds to 408, otherwise the algorithm proceeds to 410.

At 408, a notice is provided to the user that the product was not found, and the user can refine their search. In one example embodiment, search suggestions can be provided, such as for products that have similar spellings, similar sounding names or in other suitable manners. Likewise, lists of the user's previous searches, the most recent searches from other users, the most popular searches or other suitable data can be generated by the algorithm, to assist the user.

At 410, it is determined whether the product is in stock. In one example embodiment, it can be determined whether the product is locally available, is out of stock but on back order, is available from other retailers, has been discontinued by the manufacturer, or other suitable status data can be determined. If it is determined that the product is not in stock, the algorithm proceeds to 412, otherwise the algorithm proceeds to 414.

At 412, a notice is provided to the user that the product is out of stock, and the user can refine their search. In one example embodiment, search suggestions can be provided, such as for similar products that are in stock, or in other suitable manners.

At 414, the results are ranked. In one example embodiment, results can be ranked based on a number of times that a product has been identified in response to a search, such as for social media posts that include the product and other products, based on an amount of commercial activity associated with the social media post or in other suitable manners. The algorithm then proceeds to 416, where the ranked results are displayed.

In operation, algorithm 400 allows data in multiple databases to be searched in response to a query, to provide the practical application of improving the consistency of search results and the ability to find data of interest to the user. Algorithm 400 provides substantially more than the prior art by allowing related data in different databases to be readily identified and displayed, and for the most pertinent data for product related searches to be displayed, such as data that shows how the product looks and what it can be combined with. Although algorithm 400 is shown as a flow chart, the functions of algorithm 400 can also or alternatively be implemented as objected oriented programming, using a state diagram or in other suitable manners.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes one or more microcomputers or other suitable data processing units, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. The term "data" can refer to a suitable structure for using, conveying or storing data, such as a data field, a data buffer, a data message having the data value and sender/receiver address data, a control message having the data value and one or more operators that cause the receiving system or component to perform a function using the data, or other suitable hardware or software components for the electronic processing of data.

In general, a software system is a system that operates on a processor to perform predetermined functions in response to predetermined data fields. A software system is typically created as an algorithmic source code by a human programmer, and the source code algorithm is then compiled into a machine language algorithm with the source code algorithm functions, and linked to the specific input/output devices, dynamic link libraries and other specific hardware and software components of a processor, which converts the processor from a general purpose processor into a specific purpose processor. This well-known process for implementing an algorithm using a processor should require no explanation for one of even rudimentary skill in the art. For example, a system can be defined by the function it performs and the data fields that it performs the function on. As used herein, a NAME system, where NAME is typically the name of the general function that is performed by the system, refers to a software system that is configured to operate on a processor and to perform the disclosed function on the disclosed data fields. A system can receive one or more data inputs, such as data fields, user-entered data, control data in response to a user prompt or other suitable data, and can determine an action to take based on an algorithm, such as to proceed to a next algorithmic step if data is received, to repeat a prompt if data is not received, to perform a mathematical operation on two data fields, to sort or display data fields or to perform other suitable well-known algorithmic functions. Unless a specific algorithm is disclosed, then any suitable algorithm that would be known to one of skill in the art for performing the function using the associated data fields is contemplated as falling within the scope of the disclosure. For example, a message system that generates a message that includes a sender address field, a recipient address field and a message field would encompass software operating on a processor that can obtain the sender address field, recipient address field and message field from a suitable system or device of the processor, such as a buffer device or buffer system, can assemble the sender address field, recipient address field and message field into a suitable electronic message format (such as an electronic mail message, a TCP/IP message or any other suitable message format that has a sender address field, a recipient address field and message field), and can transmit the electronic message using electronic messaging systems and devices of the processor over a communications medium, such as a network. One of ordinary skill in the art would be able to provide the specific coding for a specific application based on the foregoing disclosure, which is intended to set forth exemplary embodiments of the present disclosure, and not to provide a tutorial for someone having less than ordinary skill in the art, such as someone who is unfamiliar with programming or processors in a suitable programming language. A specific algorithm for performing a function can be provided in a flow chart form or in other suitable formats, where the data fields and associated functions can be set forth in an exemplary order of operations, where the order can be rearranged as suitable and is not intended to be limiting unless explicitly stated to be limiting.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:
1. A system for database access comprising:
   a plurality of databases comprising:
      a social media post database including a plurality of data fields associated with one or more social media posts;
      a product database including a plurality of data fields associated with one or more products; and
      at least one processor coupled to the plurality of databases, the at least one processor configured to:
         create an algorithmic relationship between the plurality of data fields of the social media post database and the plurality of data fields of the product database, wherein creating the algorithmic relationship further comprises creating a data migration relationship between a first data field of the social media post database and a corresponding second data field of the product database, the data migration relationship causing the social media post database to be dependent on the product database;
         generate a product schema for the social media post database and the product database;
         modify a database structure of the social media post database and the product database to include the product schema;
         receive product data from a user;
         using one or more descriptive product terms based on the product data, search the plurality of data fields of the product database to obtain one or more product catalog numbers;

using the one or more product catalog numbers and/or the one or more descriptive product terms, search the plurality of data fields of the social media post database to identify one or more posts associated with the one or more product catalog numbers and/or the one or more descriptive product terms;

compare the identified one or more posts with one or more products in the product database that are associated with the one or more product catalog numbers;

determine, based on the comparison, whether to modify one or more data fields in the social media post database and/or the product database; and modify, based on the determining, the one or more data fields in the social media post database, the modifying including deleting at least one data field content of the one or more data fields of the social media post database and replacing the at least one data field content with a hyperlink to the one or more data fields in the product database.

2. The system of claim 1 wherein the plurality of data fields of the social media post database and the product database comprise product identifier fields, product description fields and product image fields, wherein the social media post database further includes contextualized media and associated metadata, and wherein the at least one processor is further configured to:

receive one or more user-entered search terms from the user; and return the contextualized media and the associated metadata to the user.

3. The system of claim 1 wherein the product database is associated with a merchant, and wherein the plurality of data fields of the product database and the social media post database comprise product identifier fields, product description fields and product image fields.

4. The system of claim 1 wherein the product database is associated with a website provider, and wherein the plurality of data fields of the product database and the social media post database comprise product identifier fields, product description fields and product image fields.

5. The system of claim 1, wherein the at least one processor is further configured to apply the product schema to the plurality of data fields of the product database, and the corresponding plurality of data fields of the social media post database.

6. The system of claim 1, wherein the at least one processor is further configured to:

automatically modify the algorithmic relationship between the modified one or more data fields and other data fields of the social media post database.

7. The system of claim 1, wherein the at least one processor is further configured to:

receive the plurality of data fields of the product database and the plurality of data fields of the social media post database; and generate a search index from the plurality of received data fields.

8. A method for providing database access using a system comprising at least one processor coupled to a plurality of databases, the plurality of databases comprising (i) a social media post database including a plurality of data fields associated with one or more social media posts and (ii) a product database including a plurality of data fields associated with one or more products, the method comprising:

creating an algorithmic relationship between the plurality of data fields of the social media post database and the plurality of data fields of the product database, wherein creating the algorithmic relationship further comprises creating a data migration relationship between a first data field of the social media post database and a corresponding second data field of the product database, the data migration relationship causing the social media post database to be dependent on the product database;

generating a product schema for the social media post database and the product database;

modifying a database structure of the social media post database and the product database to include the product schema;

receiving product data from a user;

using one or more descriptive product terms based on the product data, searching the plurality of data fields of the product database to obtain one or more product catalog numbers;

using the one or more product catalog numbers and/or the one or more descriptive product terms, searching the plurality of data fields of the social media post database to identify one or more posts associated with the one or more product catalog numbers and/or the one or more descriptive product terms;

comparing the identified one or more posts with one or more products in the product database that are associated with the one or more product catalog numbers;

determining, based on the comparison, whether to modify one or more data fields in the social media post database and/or the product database; and modifying, based on the determining, the one or more data fields in the social media post database, the modifying including deleting at least one data field content of the one or more data fields of the social media post database and replacing the at least one data field content with a hyperlink to the one or more data fields in the product database.

9. The method of claim 8 wherein the plurality of data fields of the social media post database and the product database comprise product identifier fields, product description fields and product image fields, and wherein the product database is associated with a website provider.

10. The method of claim 8 wherein the plurality of data fields of the social media post database and the product database comprise product identifier fields, product description fields and product image fields, and wherein the product database is associated with a merchant.

11. The method of claim 8 wherein the plurality of data fields of the social media post database and the product database comprise product identifier fields, product description fields and product image fields, wherein the social media post database further includes contextualized media and associated metadata, and wherein the method further comprises:

receiving one or more user-entered search terms from the user; and returning the contextualized media and the associated metadata to the user.

12. The method of claim 8 further comprising applying the product schema to the plurality of data fields of the product database and the corresponding plurality of data fields of the social media post database.

13. The method of claim 8 further comprising:
automatically modifying the algorithmic relationship between the modified one or more data fields and other data fields of the social media post database.

14. The method of claim 8 further comprising:
receiving the plurality of data fields of the product database and the plurality of data fields of the social media post database; and
generating a search index from the plurality of received data fields.

15. A non-transitory computer-readable medium storing computer-executable instructions, which, when executed by at least one processor coupled to a plurality of databases, the plurality of databases comprising (i) a social media post database including a plurality of data fields associated with one or more social media posts and (ii) a product database including a plurality of data fields associated with one or more products, cause the at least one processor to perform operations comprising:
creating an algorithmic relationship between the plurality of data fields of the social media post database and the plurality of data fields of the product database, wherein creating the algorithmic relationship further comprises creating a data migration relationship between a first data field of the social media post database and a corresponding second data field of the product database, the data migration relationship causing the social media post database to be dependent on the product database;
generating a product schema for the social media post database and the product database;
modifying a database structure of the social media post database and the product database to include the product schema;
receiving product data from a user;
using one or more descriptive product terms based on the product data, searching the plurality of data fields of the product database to obtain one or more product catalog numbers;
using the one or more product catalog numbers and/or the one or more descriptive product terms, searching the plurality of data fields of the social media post database to identify one or more posts associated with the one or more product catalog numbers and/or the one or more descriptive product terms;
comparing the identified one or more posts with one or more products in the product database that are associated with the one or more product catalog numbers;
determining, based on the comparison, whether to modify one or more data fields in the social media post database and/or the product database; and
modifying, based on the determining, the one or more data fields in the social media post database, the modifying including deleting at least one data field content of the one or more data fields of the social media post database and replacing the at least one data field content with a hyperlink to the one or more data fields in the product database.

16. The non-transitory computer-readable medium of claim 15, wherein the plurality of data fields of the social media post database and the product database comprise product identifier fields, product description fields and product image fields, wherein the social media post database further includes contextualized media and associated metadata, and wherein the instructions cause the at least one processor to perform further operations including:
receiving one or more user-entered search terms from the user; and
return the contextualized media and the associated metadata to the user.

17. The non-transitory computer-readable medium of claim 15, wherein the instructions cause the at least one processor to perform further operations including:
automatically modify the algorithmic relationship between the modified one or more data fields and other data fields of the social media post database.

\* \* \* \* \*